(12) United States Patent
Tressel

(10) Patent No.: US 9,199,583 B2
(45) Date of Patent: Dec. 1, 2015

(54) VEHICLE MOUNTED GOLF BAG HOLDING DEVICE

(71) Applicant: Russel Tressel, Courtenay (CA)

(72) Inventor: Russel Tressel, Courtenay (CA)

(*) Notice: Subject to any disclaimer, the term of this patent is extended or adjusted under 35 U.S.C. 154(b) by 0 days.

(21) Appl. No.: 14/484,041

(22) Filed: Sep. 11, 2014

(65) Prior Publication Data

US 2015/0175084 A1   Jun. 25, 2015

Related U.S. Application Data

(60) Provisional application No. 61/920,305, filed on Dec. 23, 2013.

(51) Int. Cl.
  *B60R 9/06* (2006.01)
  *B60R 9/08* (2006.01)

(52) U.S. Cl.
  CPC .... *B60R 9/06* (2013.01); *B60R 9/08* (2013.01)

(58) Field of Classification Search
  CPC ............. B60R 9/00; B60R 9/06; B60R 9/08; B60R 2011/004; B60R 9/048
  See application file for complete search history.

(56) References Cited

U.S. PATENT DOCUMENTS

| | | | | |
|---|---|---|---|---|
| 2,822,969 A * | 2/1958 | Cooper | .................. | 224/42.32 |
| 3,976,213 A * | 8/1976 | Ball | .................. | 414/462 |
| 4,915,276 A * | 4/1990 | Devito | .................. | 224/521 |
| 5,052,604 A * | 10/1991 | Tourangeau | .................. | 224/274 |
| 5,190,195 A * | 3/1993 | Fullhart et al. | .................. | 224/497 |
| 5,579,972 A * | 12/1996 | Despain | .................. | 224/506 |
| 5,676,292 A * | 10/1997 | Miller | .................. | 224/524 |
| 5,727,642 A * | 3/1998 | Abbott | .................. | 180/65.1 |
| 5,806,738 A * | 9/1998 | D'Angelo | .................. | 224/521 |
| 6,006,973 A * | 12/1999 | Belinky et al. | .................. | 224/510 |
| 6,039,227 A | 3/2000 | Stark | | |
| 6,126,050 A * | 10/2000 | Aliano, Jr. | .................. | 224/274 |
| D437,578 S | 2/2001 | Stannard-Warne | | |
| 6,427,854 B1 | 8/2002 | Grossi et al. | | |
| 6,478,203 B2 | 11/2002 | Burns | | |
| 6,494,352 B1 * | 12/2002 | Mullen | .................. | 224/524 |
| 6,554,171 B1 | 4/2003 | Ewing, III | | |
| 8,590,758 B2 * | 11/2013 | Gray | .................. | 224/532 |
| 2006/0181041 A1 * | 8/2006 | Feldman | .................. | 280/47.131 |
| 2007/0051763 A1 * | 3/2007 | Adrian | .................. | 224/274 |
| 2008/0135591 A1 * | 6/2008 | Cassoni | .................. | 224/274 |
| 2008/0206030 A1 * | 8/2008 | Reuille et al. | .................. | 414/462 |
| 2009/0261136 A1 * | 10/2009 | Skoff | .................. | 224/519 |
| 2010/0181357 A1 * | 7/2010 | Christianson | .................. | 224/497 |

* cited by examiner

*Primary Examiner* — Brian D Nash
(74) *Attorney, Agent, or Firm* — Global Intellectual Property Agency LLC; Daniel Boudwin

(57) ABSTRACT

Described is a golf bag holding device adapted to be removably secured to a rear portion of a vehicle. The present invention includes one or more base plates on which a bottom of a golf bag can be positioned such that the golf bag is in an upright orientation. The base plates are secured to a base support which can be removably secured to a hitch of a vehicle via a vehicle attachment. An elongated bar extends vertically upward from the base support and includes a crossbar with one or more golf bag supports thereon. The golf bag supports include an adjustable strap for holding an upper portion of a golf bag so as to secure the golf bag to the golf bag holding device. Thus, the present invention provides a user with a means to transport golf bags without having to place the golf bag inside of a vehicle.

11 Claims, 3 Drawing Sheets

VEHICLE MOUNTED GOLF BAG HOLDING DEVICE

CROSS REFERENCE TO RELATED APPLICATION

This application claims the benefit of U.S. Provisional Application No. 61/920,305 filed on Dec. 23, 2013, entitled "Small Car Golf Bag Carrier." The above identified patent application is herein incorporated by reference in its entirety to provide continuity of disclosure.

BACKGROUND OF THE INVENTION

1. Field of the Invention

The present invention relates to golf bag holding devices that are securable to vehicles. More specifically, the present invention provides a golf bag holding device that can be used to support one or more golf bags thereon in an upright orientation, and that can be removably secured to a rear portion of a vehicle. The golf bag holding device includes one or more base plates on which the bottom of a golf bag can be supported, and one or more golf bag supports having an adjustable strap thereon to secure an upper portion of a golf bag to the golf bag holding device.

Golfers often store their golf bags in the trunk of their vehicle. However, golf bags are large and bulky, and consume a substantial amount of space within the trunk of a vehicle. Thus, when the golf bag is placed within the trunk, the golfer is limited in his or her ability to store or transport other items in the vehicle's trunk. This is particularly true where the golfer needs to place more than one golf bag in the vehicle. Golfers often play in pairs or larger groups, thus requiring the golfer to transport more than one golf bag in a single vehicle.

Many golfers find it difficult or inconvenient to place golf bags within the trunk of a vehicle. The golfer must lift the golf bag and rotate the bag into a horizontal orientation prior to placing the golf bag into the vehicle. The golf bag must be maneuvered so as to fit within the trunk such that the trunk of the vehicle can be closed. This can be difficult, particularly where the vehicle's trunk is small, and where the golfer stores other items in his or her trunk.

Further, golfers who drive small vehicles, such as compact cars or smart cars may simply not have sufficient trunk or storage space for a golf bag. Thus, golfers who own these types of vehicles may have to use a different vehicle in order to bring his or her golf clubs to a golf course. However, many golfers may not have a second vehicle that the golfer can easily use, and making alternate arrangements for the purpose of transporting the golf bag may be time consuming and inconvenient.

Even golfers having vehicles with sufficient storage space, such as SUVs or large sedans, may simply wish to avoid placing golf bags within their vehicle. Golf bags and the clubs therein can become dirty as golf bags are often rested on the ground while the golfer is taking his or her shot. Thus, the golf bag or the clubs therein may become muddy from resting on the ground. Further, the golf bag may become wet if the golfer plays on a day when it rains, and the golfer may wish to avoid placing the wet or dirty golf bag into his or her vehicle.

The present invention provides a golf bag holding device that can be removably secured to the rear of a vehicle on the exterior thereof, and that can be used to support one or more golf bags in an upright position. The golf bag holding device comprises a base support on which one or more base plates are pivotally secured. The base plates are used to support the bottom of a golf bag that is positioned in an upright orientation. The base support is removably secured to a vehicle using a vehicle attachment, such as a trailer hitch. An elongated bar extends upward from the vehicle support and includes a crossbar having one or more golf bag supports thereon. Each golf bag support includes a horizontal bar having outwardly extending flanges thereon. A golf bag can be positioned against the golf bag support, and an adjustable strap can be used to secure the golf bag to the golf bag support. One or more attachment cables are disposed on the golf bag support and can be wrapped around a golf bag to further secure the golf bag.

2. Description of the Prior Art

Devices have been disclosed in the prior art that relate to golf bag holding devices. These include devices that have been patented and published in patent application publications. These devices generally relate to golf bag holders that can be mounted to vehicles. The following is a list of devices deemed most relevant to the present disclosure, which are herein described for the purposes of highlighting and differentiating the unique aspects of the present invention, and further highlighting the drawbacks existing in the prior art.

One such device, U.S. Pat. No. 6,039,227 to Stark discloses a golf bag carrier adapted to be secured to a vehicle. The golf bag carrier comprises a rectangular pan on which the bottom of a golf bag disposed in a vertical orientation can be placed. The device is secured to a bumper of a vehicle via a trailer hitch of conventional construction. A vertical member extends from the pan and includes a horizontal member thereon that includes support arms for stabilizing a golf bag or bags. While Stark discloses a golf bag carrier attachable to a rear portion of a vehicle, Stark fails to disclose a golf bag carrier having one or more pivoting base plates that can be used to support the bottom of a golf bag or that can be folded into a compact configuration. Further, Stark fails to disclose adjustable straps and attachment cables for securing golf bags thereon.

U.S. Pat. No. 6,554,171 to Ewing, III discloses a golf bag rack securable to the rear of a vehicle by means of a hitch receiver. The rack includes one or more platforms on which golf bags can be positioned. A vertical bar extends upward therefrom and includes a horizontal crossbar for the purpose of supporting the upper portion of a golf bag or bags. The crossbar can be extended or collapsed so as to support one or more golf bags on the rack. Thus, Ewing, III discloses a golf bag rack that is securable to a vehicle, but Ewing, III fails to disclose a golf bag rack having separate bases that are able to pivot between a horizontal and vertical configuration. Further, Ewing, III fails to disclose adjustable straps disposed on an upper end of the device for securing golf bags thereon. Moreover, Ewing, III does not include attachment cables for securing the golf bag on the golf bag holding device.

U.S. Pat. No. 6,427,854 to Grossi et al. discloses a rack adapted to hold a golf bag thereon and that can be mounted to a vehicle. The device includes a hitch mounting member to be secured to a vehicle hitch. The device further includes bag support members and an elongated support bar having brackets thereon. Thus, Grossi fails to disclose a golf bag carrier having one or more pivoting base plates on which a golf bag can be disposed, and having adjustable straps for securing the golf bag thereon.

U.S. Design Pat. No. D437578 to Stannard-Warne discloses the ornamental design for a golf bag carrier attachable to a vehicle. The carrier comprises an elongated tray adapted to support the bottom of a golf bag in a vertical orientation. A vertical upright support extends therefrom and includes crossbars thereon for supporting the upper portion of a golf bag. A trailer hitch receiver is included for attaching the device to the rear of a vehicle. While Stannard-Warne discloses a golf bag support securable to a vehicle, the device does not include pivoting base plates for supporting the bottom of a golf bag, and adjustable straps for securing the golf bag to the device.

Finally, U.S. Pat. No. 6,478,203 to Burns discloses a carrier and hitch assembly attachable to a vehicle. The device comprises an elongated housing in which a golf bag can be positioned. The housing includes an attachment structure for securing the device to a hitch assembly. The housing includes a door thereon providing access to the interior volume thereof. The housing further includes wheels and a handle so that the device may be used as a cart. Thus, Burns fails to disclose a golf bag carrier having one or more pivoting base plates on which golf bags can be supported, and that includes adjustable straps.

These prior art devices have several known drawbacks. Various devices in the prior art relate to golf bag carrying devices that are attachable to the trailer hitch assembly of a vehicle. Such devices fail to disclose pivoting base plates on which golf bags can be positioned. The ability to pivot the base plates into a vertical orientation when not in use allows the device to have a compact configuration, and provides a user with greater access to the rear or trunk of the vehicle. Further, devices in the prior art fail to disclose adjustable straps for securing golf bags thereon. The use of adjustable straps helps to hold the golf bags securely on the golf bag holding device. Further, devices in the prior art do not disclose attachment cables for providing additional securement of the golf bags.

In light of the devices disclosed in the prior art, it is submitted that the present invention substantially diverges in design elements from the prior art and consequently it is clear that there is a need in the art for an improvement to existing vehicle mountable golf bag holding devices. In this regard the instant invention substantially fulfills these needs.

SUMMARY OF THE INVENTION

In view of the foregoing disadvantages inherent in the known types of golf bag carrying devices now present in the prior art, the present invention provides a new golf bag carrying device wherein the same can be utilized for providing convenience for the user when transporting one or more golf bags on the exterior of a vehicle so as to eliminate the need for the user to store the golf bag or bags within the user's vehicle.

It is therefore an object of the present invention to provide a new and improved vehicle mounted golf bag carrying device that has all of the advantages of the prior art and none of the disadvantages.

It is another object of the present invention to provide a vehicle mounted golf bag carrying device that is removably securable to the rear of a vehicle.

Another object of the present invention is to provide a vehicle mounted golf bag carrying device adapted to allow a user to transport golf bags on the exterior of a vehicle to eliminate the need for the user to store the golf bag or bags within the vehicle.

Yet another object of the present invention is to provide a vehicle mounted golf bag carrying device having one or more pivoting base plates on which a user can position a golf bag in an upright orientation.

Another object of the present invention is to provide a vehicle mounted golf bag carrying device having adjustable straps that are used to removably secure a golf bag thereon.

A further object of the present invention is to provide a vehicle mounted golf bag carrying device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
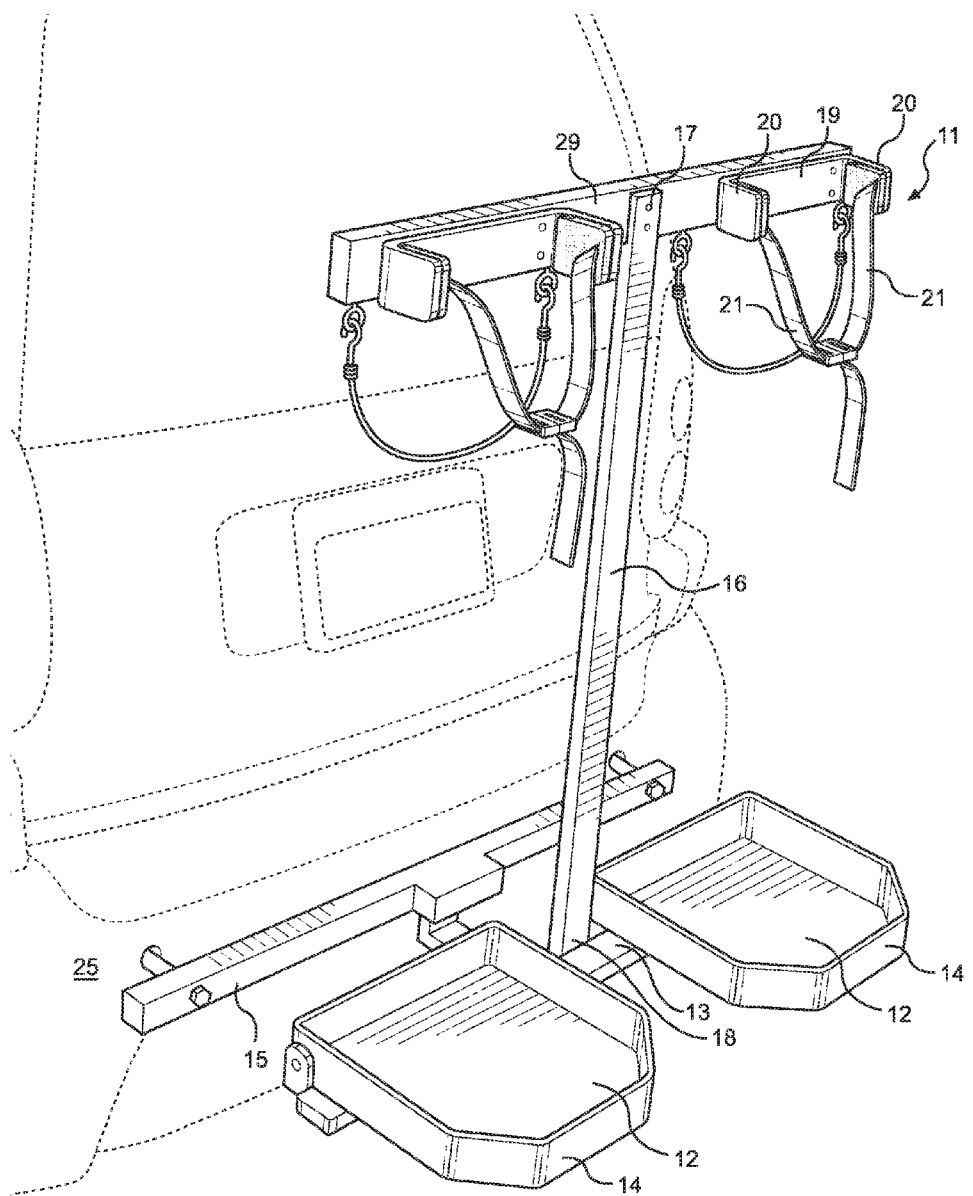
FIG. 1 shows a perspective view of an embodiment of the golf bag holding device of the present invention as secured to the rear of a vehicle.

Reference is made herein to the attached drawings. Like reference numerals are used throughout the drawings to depict like or similar elements of the golf bag holding device of the present invention. For the purposes of presenting a brief and clear description of the present invention, the preferred embodiment will be discussed as used for transporting golf bags on the exterior of a vehicle. The figures are intended for representative purposes only and should not be considered to be limiting in any respect.

Referring now to FIG. 1, there is shown a perspective view of an embodiment of the golf bag holding device of the present invention as secured to the rear of a vehicle. The golf bag holding device 11 comprises a base support 13 that includes an elongated bar disposed in a horizontal orientation. One or more base plates 12 are pivotally secured to the base support 13 and are able to pivot between a horizontal orientation wherein a golf bag in a vertical orientation can be positioned thereon, and a vertical orientation in which the base plates 12 are folded into a compact configuration. The base plates 12 are preferably substantially square in shape and may have rounded corners. The base plates 12 include an upwardly extending flange 14 about the perimeter thereof. The flange 14 helps to retain the bottom of a golf bag in position on the base plate 12, and prevents the golf bag from slipping or sliding off of the base plate 12.

A trailer hitch assembly 15 is disposed on the base support 13 and is adapted to be secured to the rear of a vehicle. Preferably, the trailer hitch assembly 15 is adapted to engage with a conventional trailer hitch on the rear of a vehicle. In this way, the golf bag holding device 11 can be removably secured to the rear of a vehicle by means of the trailer hitch assembly 15 thereon. The trailer hitch assembly 15 includes an elongated bracket having fasteners thereon that can be engaged with a vehicle's trailer hitch or other attachment means disposed on the rear of a vehicle.

An elongated, upright bar 16 extends upward from the base support 13 and is attached thereto at a second end 18 thereof. The first end 17 of the upright bar 16 includes a crossbar 29 disposed in a horizontal orientation, perpendicular to the upright bar 16. The crossbar 29 has one or more golf bag supports 19 thereon. Each golf bag support 19 comprises a horizontal portion and a pair of outwardly extending arms 20, forming a U-shape. In this way, a golf bag can be positioned between the pair of arms 20 so that it rests against the golf bag support 19. The golf bag supports 19 are aligned vertically above the base plates 12 so that a bottom end of a golf bag can be disposed on the base plate 12 and the upper end of the golf bag can be positioned within the golf bag support 19. Preferably, each base plate 12 has a corresponding golf bag support 19. The golf bag supports 19 further include adjustable straps 21 thereon. The adjustable straps 21 are attached to the arms 20 of the golf bag supports 19. The adjustable straps 21 may comprise a buckle so that they are adapted to be wrapped around an upper end of a golf bag to secure the golf bag thereon.

Figure 2:
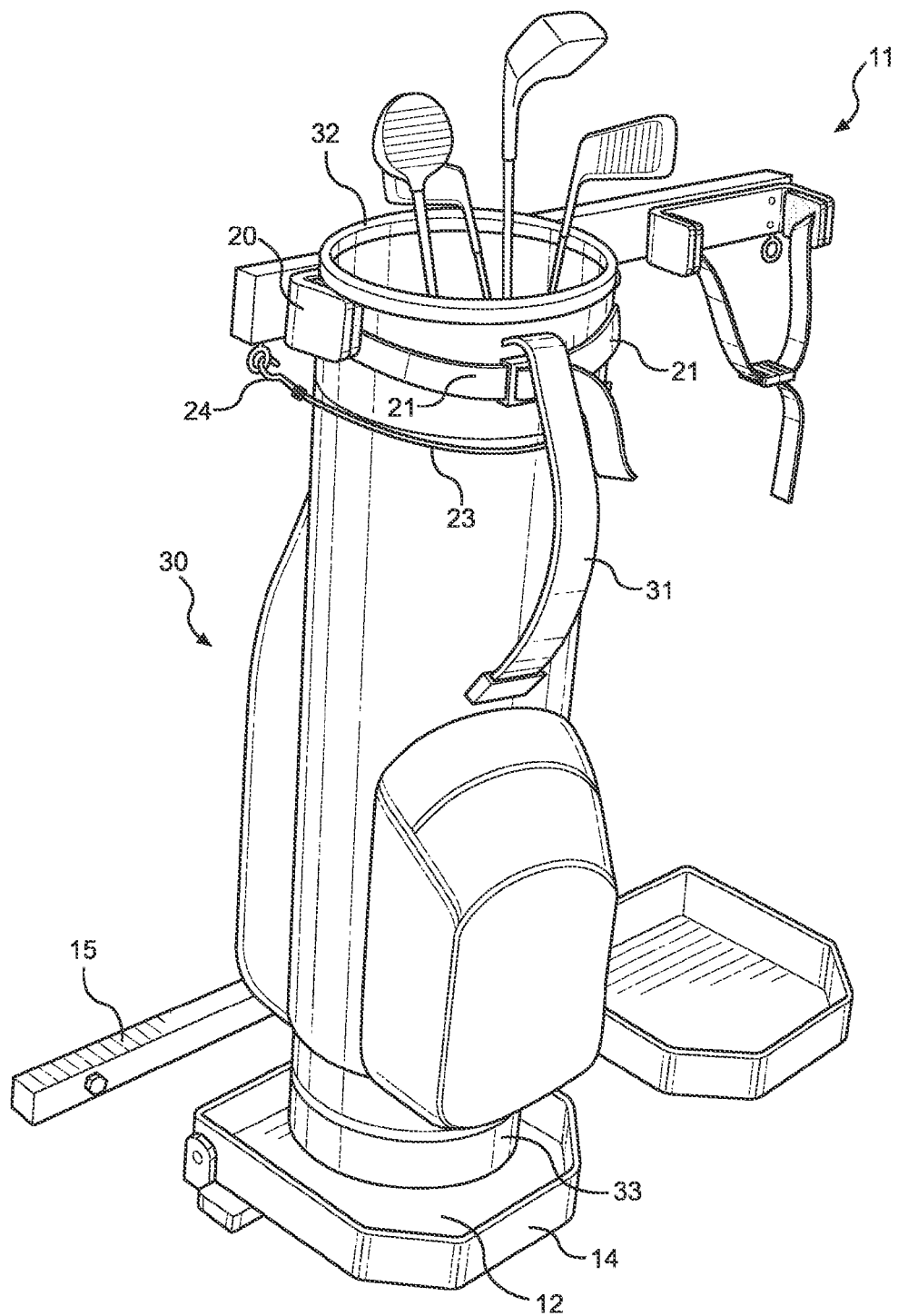
FIG. 2 shows a perspective view of an embodiment of the golf bag holding device of the present invention as used to hold a golf bag thereon.

Referring now to FIG. 2, there is shown a perspective view of an embodiment of the golf bag holding device of the present invention as used to hold a golf bag thereon. In operation, a golf bag 30 can be disposed in a vertical orientation such that the bottom 33 of the golf bag 30 rests on a base plate 12 of the golf bag holding device 11. The bottom 33 of the golf bag 30 is prevented from slipping off of the base plate 12 by a flange 14 disposed about the perimeter of the base plate 12.

The crossbar of the golf bag holding device 11 includes golf bag supports having outwardly extending arms 20 thereon. The upper end 32 of a golf bag 30 can be disposed within a golf bag support such that the golf bag 30 leans against the golf bag support and is positioned between the arms 20 thereof. An adjustable strap 21 disposed on the golf bag support is adapted to be wrapped around the golf bag 30 so as to secure the golf bag 30 thereon. Preferably, the adjustable strap 21 can be threaded through a carrying strap 31 on the golf bag 30 to further secure the golf bag 30. The adjustable strap 21 may include a first strap and a second strap having a buckle thereon, wherein the first and second straps can be secured together using the buckle. In this way, the user can adjust the length of the strap as necessary to secure the golf bag thereon. In alternate embodiments, the adjustable strap may comprise a ratcheting strap or the like.

The crossbar further includes an attachment cable 23 thereon that is composed of a flexible, stretchable material. The attachment cable 23 includes a fastener 24, such as a hook, on each end thereof, wherein the fasteners 24 are able to be attached to O-rings or eyelet screws affixed to the crossbar. In this way, the attachment cable 23 can be secured to the crossbar and wrapped around a golf bag 30 so as to provide further securement.

Figure 3:
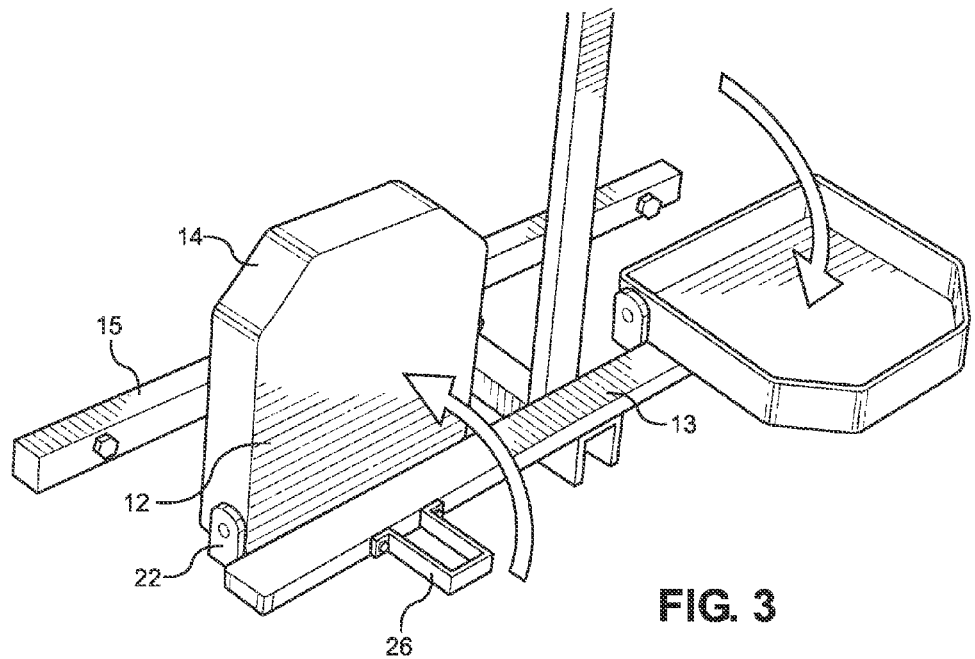
FIG. 3 shows a close-up view of a base plate of the present invention in a folded configuration.

Referring now to FIG. 3, there is shown a close-up view of a base plate of the present invention in a folded configuration. The one or more base plates 12 are pivotally secured to the base support 13 by one or more hinges 22. When not in use, the base plates 12 can be folded into a vertical configuration so as to provide the golf bag holding device with a compact configuration. Further, the compact configuration provides a user with greater access to the rear or trunk of a vehicle. When in use, the base plates 12 can be arranged in a horizontal configuration such that the base plates 12 can be used to support a golf bag thereon. The base plates 12 are positioned such that they are unable to rotate below a horizontal plane. The base plates 12 rest on top of the base support 13 which helps to support the base plates 12 in a horizontal orientation. Further, stoppers 26 are attached to the base support 13 and are disposed in a horizontal orientation. When the base plates 12 are disposed in a horizontal orientation, the base plates 12 also rest on the stoppers 26 so as to prevent further rotation and so as to provide support to the base plates 12.

Figure 4:
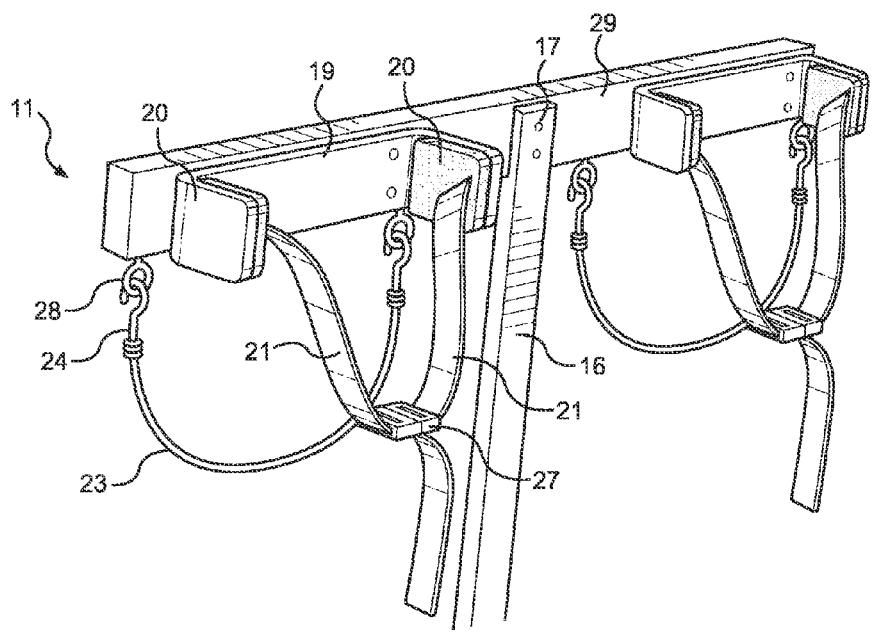
FIG. 4 shows a close-up view of the golf bag supports of the present invention.

Referring now to FIG. 4, there is shown a close-up view of the golf bag supports of the present invention. The upright bar 16 includes a horizontal crossbar 29 thereon. The horizontal crossbar 29 supports one or more golf bag supports 19 thereon. Each golf bag support 19 is substantially U-shaped. Preferably, a pair of golf bag supports 19 is disposed on the crossbar 29 on opposing sides of the upright bar 16.

The golf bag support 19 includes a horizontal bar attached to the crossbar 29 via any suitable fasteners, and having a pair of arms 20 extending perpendicularly and horizontally therefrom. An adjustable strap 21 is secured to the pair of arms 20 and can be removably secured around a golf bag. The adjustable strap 21 preferably comprises a first strap secured to one arm 20 and a second strap secured to a second arm 20 that can be adjustably secured together by means of a buckle 27. This allows the user to configure the adjustable strap 21 so that it fits tightly against a golf bag.

The crossbar 29 includes O-rings 28 on an underside surface thereof that are adapted to receive fasteners on an attachment cable 23. Preferably, a pair of O-rings 28 are disposed adjacent to each golf bag support 19, and are spaced apart similarly to the arms 20 of the golf bag support 19. The attachment cable 23 includes a stretchable cable that includes a fastener 24, such as a hook, on each end thereof. The fastener 24 can be removably engaged with a pair of O-rings 28 on the crossbar 29 so as to secure the attachment cable 23 thereon. In this way, the attachment cable 23 can be wrapped around a golf bag and secured to the pair of O-rings 28 to provide further securement of the golf bag.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A golf bag holding device adapted for use with a vehicle, comprising:
    a base support removably secured to a rear portion of a vehicle by means of a vehicle attachment;
    said base support having one or more base plates pivotally secured thereto, wherein said one or more base plates are adapted to hold a golf bag thereon in an upright orientation;
    an elongated bar disposed in a vertical orientation having a first end and a second end, wherein said first end is secured to said base support and said second end having a horizontal crossbar thereon;
    wherein each base plate is independently pivotable relative to the base support, such that each base plate is capable of rotating between a substantially vertical position and a working position, the working position comprising a substantially perpendicular orientation relative to the elongated bar;

wherein one or more golf bag supports are disposed on said crossbar and are adapted to hold an upper portion of said golf bag;

a stopper disposed under each base plate, each stopper extending from the base support substantially perpendicular to the elongated bar, whereby at least one stopper supports each base plate when in its working condition.

2. The golf bag holding device of claim 1, wherein each of said one or more base plates is vertically aligned with one of said one or more golf bag supports such that the base plates can support a lower end of a golf bag, and the golf bag supports support an upper end of the golf bag.

3. The golf bag holding device of claim 1, wherein said vehicle attachment comprises a trailer hitch assembly.

4. The golf bag holding device of claim 1, wherein said vehicle attachment is adapted to be secured to a rear bumper of said vehicle.

5. The golf bag holding device of claim 1, wherein said base support comprises an elongated bar disposed in a horizontal orientation.

6. The golf bag holding device of claim 1, wherein said one or more base plates are substantially rectangular and comprise an upwardly extending flange about the perimeter thereof.

7. The golf bag holding device of claim 1, wherein said one or more golf bag supports comprise a U-shape such that a horizontal portion is affixed to said crossbar, and a pair of arms extend outward therefrom.

8. The golf bag holding device of claim 1, wherein said one or more golf bag supports comprise an adjustable strap adapted to be wrapped around a golf bag so as to secure said golf bag to said golf bag support.

9. The golf bag holding device of claim 1, wherein said one or more golf bag supports comprise a ratcheting strap adapted to be wrapped around a golf bag so as to secure said golf bag to said golf bag support.

10. The golf bag holding device of claim 1, wherein said crossbar further comprises one or more pairs of O-rings thereon.

11. The golf bag holding device of claim 10, further comprising one or more attachment cables having a fastener disposed on each end thereof, wherein each of said fastener is adapted to be removably secured to said one or more pairs of O-rings on said crossbar.

\* \* \* \* \*